(12) United States Patent
Bergman et al.

(10) Patent No.: US 12,348,487 B2
(45) Date of Patent: *Jul. 1, 2025

(54) WEB APPLICATION FIREWALL FOR AN ONLINE SERVICE

(71) Applicant: Fastly, Inc., San Francisco, CA (US)

(72) Inventors: Artur Bergman, Denver, CO (US); Sean Leach, Castle Pines, CO (US); Tyler McMullen, San Francisco, CA (US); Christian Peron, San Francisco, CA (US); Federico Schwindt, San Francisco, CA (US); Eric Hodel, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,758

(22) Filed: Sep. 11, 2023

(65) Prior Publication Data

US 2024/0007439 A1 Jan. 4, 2024

Related U.S. Application Data

(63) Continuation of application No. 17/372,941, filed on Jul. 12, 2021, now Pat. No. 11,757,838, which is a
(Continued)

(51) Int. Cl.
*H04L 29/06* (2006.01)
*H04L 9/40* (2022.01)
(Continued)

(52) U.S. Cl.
CPC ...... *H04L 63/0263* (2013.01); *H04L 63/0245* (2013.01); *H04L 63/1466* (2013.01);
(Continued)

(58) Field of Classification Search
CPC ............ H04L 63/0263; H04L 63/0245; H04L 63/1466; H04L 67/02; H04L 67/327; H04L 67/1065; H04L 67/2814; H04L 67/2842
See application file for complete search history.

(56) References Cited

U.S. PATENT DOCUMENTS 6,813,690 B1 * 11/2004 Lango ................. G06F 12/0866
711/E12.019
8,996,614 B2 * 3/2015 Choudhary ........... H04L 65/611
718/105

(Continued)

FOREIGN PATENT DOCUMENTS

GB 2529655 A * 3/2016 ............. G06F 15/16

OTHER PUBLICATIONS

Auxilia et al., "Anomaly detection using negative security model in web application", 2010 International Conference on Computer Information Systems and Industrial Management Applications (CISIM), Date of Conference: Oct. 08-10 (Year: 2010).*
(Continued)

*Primary Examiner* — Morshed Mehedi

(57) ABSTRACT

Disclosed herein are enhancements for operating a web application firewall to reduce load. In one implementation, a method of operating a content server for a web application comprising running a web accelerator with a plurality of threads on the content server. The method further provides receiving a request for content which will be provided to a web application, filtering the request and determining that the content will be requested from a second server. After determining that the content will be requested from a second server, reviewing the request with a web application firewall operating at a network layer 7, forwarding the request, receiving the content, and providing the content. Further, the
(Continued)

web application firewall is controlled by a plurality of sets of rules, which can be updated without restarting the web accelerator.

20 Claims, 7 Drawing Sheets

Related U.S. Application Data continuation of application No. 16/050,673, filed on Jul. 31, 2018, now Pat. No. 11,063,910.

(60) Provisional application No. 62/556,012, filed on Sep. 8, 2017, provisional application No. 62/539,130, filed on Jul. 31, 2017.

(51) Int. Cl.
    *H04L 67/02*         (2022.01)
    *H04L 67/1061*     (2022.01)
    *H04L 67/563*       (2022.01)
    *H04L 67/568*       (2022.01)
    *H04L 67/63*        (2022.01)

(52) U.S. Cl.
    CPC .......... *H04L 67/02* (2013.01); *H04L 67/1065* (2013.01); *H04L 67/563* (2022.05); *H04L 67/568* (2022.05); *H04L 67/63* (2022.05)

(56) References Cited

U.S. PATENT DOCUMENTS

| | | | | |
|---|---|---|---|---|
| 10,630,758 | B2* | 4/2020 | Alstad | H04L 67/55 |
| 2004/0064351 | A1 | 4/2004 | Mikurak | |
| 2006/0294223 | A1* | 12/2006 | Glasgow | H04L 67/56 709/224 |
| 2008/0228772 | A1* | 9/2008 | Plamondon | G06F 16/9574 |
| 2013/0097600 | A1* | 4/2013 | Cardona | G06F 9/45558 718/1 |
| 2013/0152187 | A1* | 6/2013 | Strebe | H04L 63/20 726/11 |
| 2013/0254343 | A1* | 9/2013 | Stevens | H04L 67/06 709/219 |
| 2015/0205643 | A1* | 7/2015 | Miyamoto | G06F 9/5011 718/106 |
| 2016/0048868 | A1* | 2/2016 | Mirisola | G06Q 30/02 705/14.44 |
| 2016/0057163 | A1 | 2/2016 | Boffa et al. | |
| 2016/0182454 | A1 | 6/2016 | Phonsa et al. | |
| 2016/0323143 | A1* | 11/2016 | Kim | G06F 3/0629 |
| 2017/0180322 | A1 | 6/2017 | Agarwal et al. | |
| 2017/0332421 | A1* | 11/2017 | Sternberg | H04L 12/4641 |
| 2018/0013792 | A1* | 1/2018 | Glenn | H04L 63/0263 |
| 2020/0228561 | A1* | 7/2020 | Petry | H04L 63/1433 |
| 2021/0211868 | A1* | 7/2021 | Rodriguez Bravo | H04W 12/35 |
| 2021/0288942 | A1* | 9/2021 | Preda | H04L 65/612 |

OTHER PUBLICATIONS

Ho-Yu Lam et al., "A traffic-aware top-N firewall ruleset approximation algorithm", ANCS '10: Proceedings of the 6th ACM/IEEE Symposium on Architectures for Networking and Communications Systems, Article No. 9, pp. 1-2, October (Year: 2010).

Takahashi et al., "Application for Autonomous Decentralized Multi Layer Cache System to Web Application Firewall", Tenth International Symposium on Autonomous Decentralized Systems, Date of Conference: Mar. 23-27 (Year: 2011).

Stringhini et al., "Shady Paths: Leveraging Surfing Crowds to Detect Malicious Web Pages", CCS '13: Proceedings of the 2013 ACM SIGSAC conference on Computer & Communications Security, Nov. 2013, 12 pages.

\* cited by examiner

WEB APPLICATION FIREWALL FOR AN ONLINE SERVICE

RELATED APPLICATIONS

This application is a continuations of and claims the benefit of and priority to U.S. application Ser. No. 17/372,941, filed on Jul. 12, 2021, entitled "WEB APPLICATION FIREWALL FOR AN ONLINE SERVICE," as well as U.S. application Ser. No. 16/050,673, filed on Jul. 31, 2018 and issued on Jul. 13, 2021 as U.S. Pat. No. 11,063,021, entitled "WEB APPLICATION FIREWALL FOR AN INFRASTRUCTURE SERVICE," U.S. Provisional Application Ser. No. 62/539,130, filed on Jul. 31, 2017, entitled "WEB APPLICATION FIREWALL FOR A CONTENT DELIVERY NETWORK," and U.S. Provisional Application Ser. No. 62/556,012, filed on Sep. 8, 2017, entitled "WEB APPLICATION FIREWALL FOR A CONTENT DELIVERY NETWORK," which are hereby incorporated by reference in their entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

This is exacerbated by web applications that utilize a combination of cached content and active interaction between the end user and the web application. In many cases the web application requires a response directly from the origin server to queries by the end user. Combined with the already onerous task of providing static content to the end user, these web applications create a potential to overload the origin servers.

Infrastructure services have been developed which add a layer of caching between the origin servers of the content providers and the end users. These infrastructure services could be Content Delivery Networks or Edge Cloud Networks, for example. The content delivery systems typically have one or more cache nodes distributed across a large geographic region to provide faster and lower latency access to the content for the end users. When end users request content, such as a web page, which is handled through a cache node, the cache node is configured to respond to the end user requests instead of the origin servers. In this manner, a cache node can act as a proxy for the origin servers.

The cache node can also act to distribute requests to the origin servers. Sometimes content provided by the origin server should not be cached, such as when the origin server provides highly sensitive content. In these situations, the cache node can preview the request and forward it directly to a source of the content as needed.

When a cache node creates requests for the origin server, there is little risk to the origin server of a malicious attack. When the cache node acts to forward requests from an end user, there is a possibility that the original request may contain malicious content, or that the request has been altered to contain malicious content. Because of this security risk, the cache node needs some ability to screen for malicious content before forwarding requests to an origin server.

Overview

Examples disclosed herein include enhancements for operating a web application firewall to reduce load. In one implementation, a method of operating a content server for a web application comprises running a web accelerator with a plurality of threads on the content server. The method further provides receiving a request for content which will be provided to a web application, filtering the request, and determining that the content will be requested from a second server. After determining that the content will be requested from a second server, the method further includes reviewing the request with a web application firewall, forwarding the request, receiving the content, and providing the content.

In a further implementation, a method of updating a web application firewall running on a content server comprises: running a web accelerator configured to utilize scripts with a plurality of threads on the content server. The method further comprises operating the web application firewall within the web accelerator, wherein the web application firewall is controlled by a plurality of rules, comprising: a set of operating system rules; a set of standard rules; and a set of custom rules. Additionally, the method comprises receiving, from a user, a rule update to at least one of the set of operating system rules, the set of standard rules, and the set of custom rules, and updating the plurality of rules based at least in part on the rule update without restarting the web accelerator.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents. For convenience, relevant identifying numbers in the drawings are references throughout the specification, even when referring to another drawing. The number itself indicates the drawing it originates from (i.e. 1XX comes from FIG. 1, 2XX comes from FIG. 2, etc.).

DESCRIPTION

Network content, such as web page content, typically includes content such as text, hypertext markup language (HTML) pages, pictures, video, audio, code, scripts, or other content viewable by an end user in a browser or other application. The network content can be stored and served by origin servers and equipment. The network content includes example website content referenced in FIG. 1, such as "www.alpha.com," or "www.beta.com," but may include various other content. In some examples, origin servers can serve the content to end user devices. However, when a content delivery system is employed, the content delivery system can act as a proxy to cache content between origin servers and the end user devices.

Infrastructure services can add a layer of caching between origin servers of the content providers and the end users. The infrastructure services typically have one or more cache nodes distributed across a large geographic region to provide faster and lower latency local access to the content for the end users. When end users request content, such as a web page, a locally proximate cache node will respond to the content request instead of the associated origin server. Various techniques can be employed to ensure the cache node responds to content requests instead of the origin servers. Such techniques include associating web content of the origin servers with network addresses of the cache nodes instead of network addresses of the origin servers using domain name system (DNS) registration and lookup procedures.

In some implementations, the cache nodes of the infrastructure service may only cache a portion of the content that is stored on the origin servers. Consequently, if a request is generated by an end user device that cannot be satisfied by the cache node, the cache node may be required to generate an origin content request to retrieve the required content. These origin requests, in some examples, may be processed using any one of a plurality of origin servers, wherein the origin servers are each capable of responding to the origin requests.

Web applications can add another level of complexity. A web application is a client-server software application in which the user interface runs in a web browser. This could include mobile applications or single page applications, for example. Unlike static web pages, the content requested by web applications is often dynamic, such that it is never the same twice, or event driven, such that the content changes. It would not be efficient to cache such content within a cache node. Web applications frequently create and send requests for content that is not to be cached. In this case, the cache node operates to direct the request to the origin server.

Figure 1:
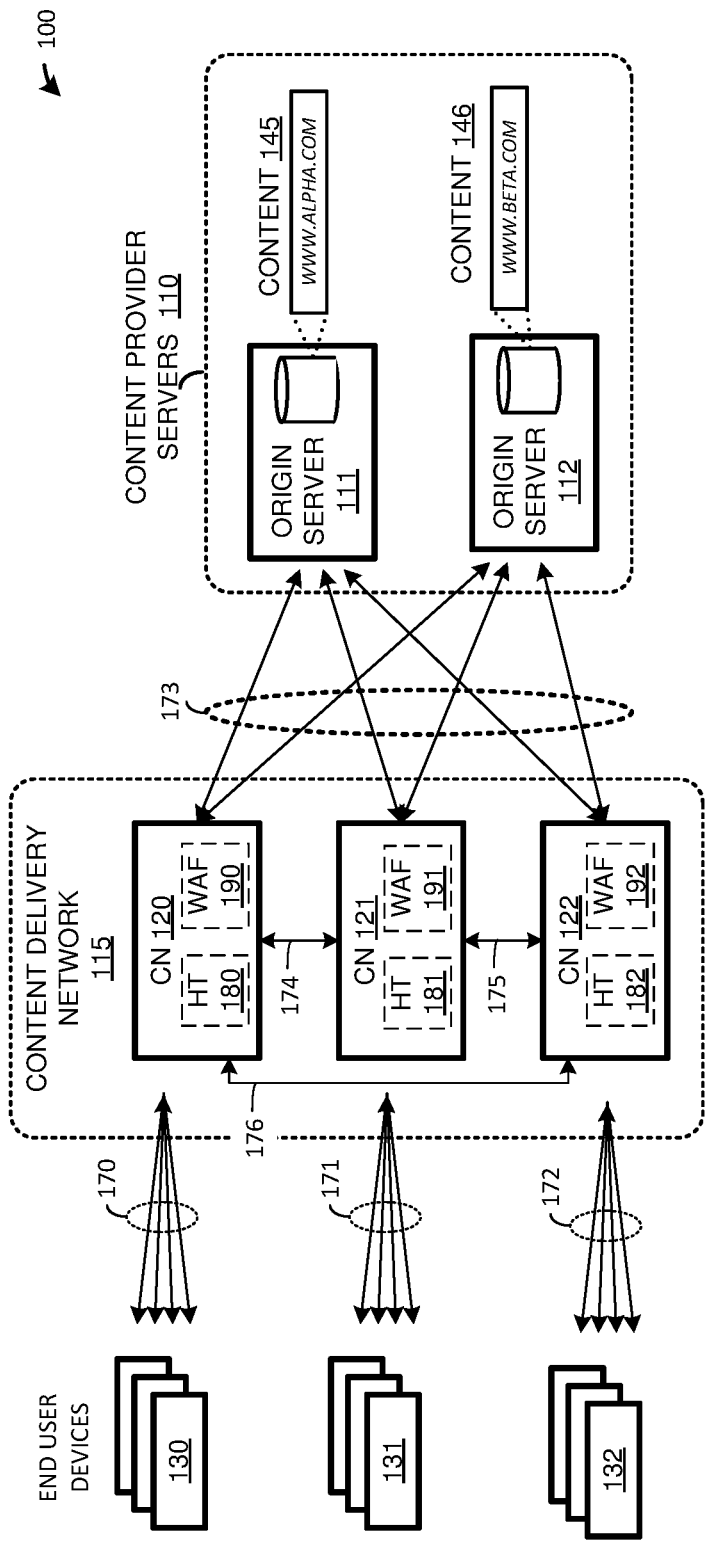
FIG. 1 illustrates a communication system to distribute content requests to origin servers according to one implementation.

Referring now to FIG. 1, FIG. 1 illustrates a communication system 100 to distribute origin requests to origin servers according to one implementation. Communication system 100 includes end user devices 130-132, content nodes (CNs) 120-122, and origin servers 111-112. Content nodes 120-122 make up infrastructure service 115, which caches content from content provider servers 110, including origin servers 111-112. End user devices 130-132 communicate with content nodes 120-122 via communication links 170-172. Content nodes 120-122 communicate with origin servers 111-112 via communication link 173, and further communicate with one another via communication links 174-176. Each of content nodes 120-122 contain modules to operate hash tables 180-182 and web application firewalls 190-192, respectively.

To further illustrate FIG. 1, a brief description of the operation of communication system 100 is provided. In operation, end user devices 130-132 request network content, such as content 145-146, from content nodes 120-122 in infrastructure service 115. In particular, rather than being directed to origin servers 111-112, content nodes 120-122 act as proxy servers that cache content in local storage systems from origin servers 111-112 and provide the content, if available, to the requesting end user devices. When the request is sent to content nodes 120-122, the request is routed to a hash table 180-182, respectively. The hash table 180-182 contains information on whether the content request can be handled by the content node 120-122 or must be forwarded to the origin server 111-112. Prior to a request being forwarded to origin server 111-112, the request will pass through web application firewall 190-192, respectively.

In some implementations, web applications may operate within a web browser on end user devices 130-132. The web applications will then create requests for content 145-146 which are sent to content nodes 120-122. These requests are frequently dynamic or event-driven, making them uncacheable.

In some implementations, to gather required content for end user devices 130-132, content nodes 120-122 may be required to make origin content requests to retrieve the required content from origin servers 111-112 or forward the requests created by the web applications. For example, if a user device in end user devices 130-132 requests content that is not cached in the associated content node 120, the content node 120 may request one of origin servers 111-112 for the required content and provide the content to the requesting end user device. Further, in some implementations, the content node 120 may cache the retrieved content in storage to provide for the next content request. As illustrated in FIG. 1, each of content nodes 120-122 is capable of requesting content or forwarding a request for content from either origin server 111-112.

In an implementation, infrastructure service 115 is managed by one entity, while content 145 and content 146 are owned and/or operated by separate entities. Infrastructure service 115 provides a service to the owners and/or operators of Content 145 and 146. Consequently, content node 120, for example, can service both origin server 111, which contains content 145 and origin server 112, which contains content 146. Indeed, content node 120 may service many more origin servers which contain many more sources of content. Each source of content, such as content 145 and content 146 may have different operating parameters for content node 120 to follow. In an implementation, content node 120 processes each request for content according to the operating rules or parameters that are specified for the relevant source of content.

Figure 2A:
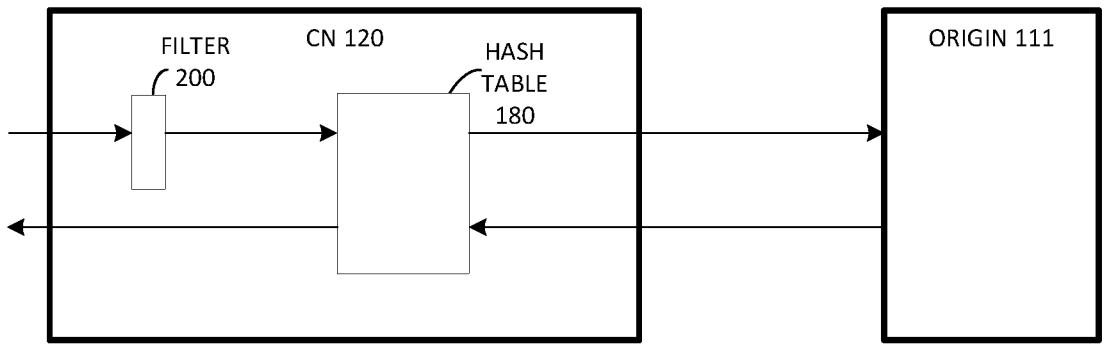
FIG. 2A illustrates a communication system with a firewall according to one implementation.
Figure 2B:
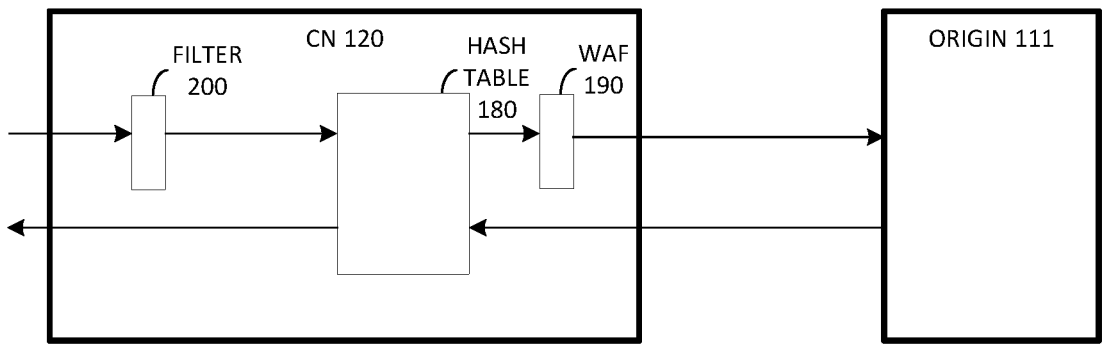
FIG. 2B illustrates a communication system with a firewall according to one implementation.
Figure 2C:
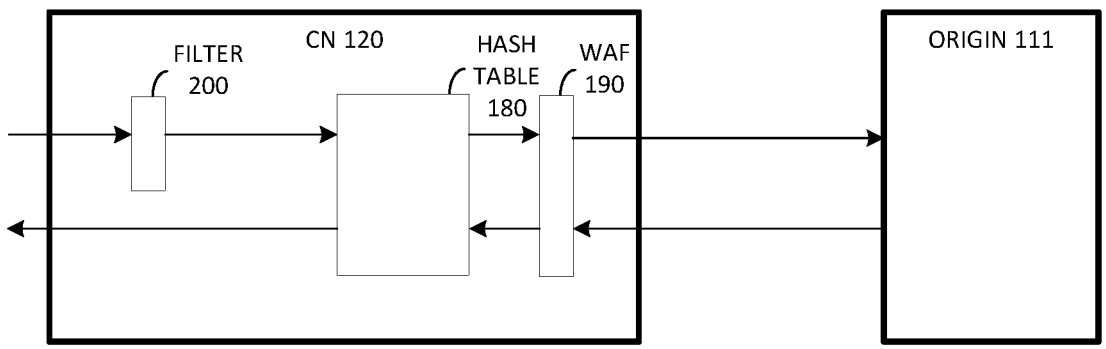
FIG. 2C illustrates a communication system with a firewall according to one implementation.

To further demonstrate the operation of the content node 120 according to an embodiment, particularly with regard to firewall security, FIGS. 2A through 2C are provided. In FIG. 2A, a request for content is received into content node 120, and proceeds to a module that operates as a filter 200. The filter 200 operates on layer 3 (network layer) or layer 4 (transport layer) of the OSI network reference model and acts to block requests from certain locations. In addition, the filter 200 logs a record of any request for content that is filtered. After the filter 200 has passed the request, it proceeds to a module that serves as a hash table 180.

The hash table 180 holds information about what information is cached in the content node 120, as well as whether that information is fresh or stale. The hash table 180 receives the request for content and determines whether the content node 120 has the appropriate information to respond to the request. This includes requests for cacheable data, for which the hash table 180 will determine whether the content node 120 holds up-to-date content that is being requested. The determination also includes identifying requests for uncacheable content. This may be, for example, secure information requested by a web application, such as financial data, or individual email, for example. In some cases, the user or web application issuing the request for content is aware that a request is uncacheable, but in some cases, this is known only within the content node 120. The hash table 180 determines that some requests need to proceed to the origin server to get the appropriate content. The content node 120 creates a new request for content to send to the origin server 111 to get the appropriate content.

The origin server 111 may actually be more than one server. The origin server 111 holds the original content that is requested by the user. This content may be cacheable, in which case it can be offloaded to proxies such as content node 120 to reduce the operational load on origin server 111, or it may be uncacheable, and the request will be handled by the origin server. The content is then sent from the origin server 111 to the content node 120, and the hash table 180 is updated. This update will show that the content node 120 now has the content in cache if it is cacheable data, or in the case of uncacheable data, the hash table may only be updated to show that the content was received. The content is then returned to the requester (i.e. the user or web application).

In FIG. 2B, a request is received by content node 120 and proceeds to the filter 200. The filter limits or identifies requests from certain addresses that are flagged and logs the action. The request then proceeds to the hash table 180, and the hash table 180 determines whether content node 120 has the requested content. Requests for uncacheable content, or content requests that are to be passed directly through to the origin server 111 will be sent to a web application firewall 190. Content node 120 may also create a new request for content to send to the origin server 111 to get the appropriate content.

The web application firewall can operate on layer 7 of the OSI network reference model and reviews the request for content for security issues. The origin server 111 is prone to be the target of malicious attacks, due to the high volume of content processed by the origin server 111 and the sensitive nature of some of the content. Forwarding requests for content to the origin server 111 directly creates a risk for attack to the origin server 111.

Web applications can communicate between the web application on the end user device and the origin server 111, including issuing commands to the origin server 111. These commands are contained within the request for content. It is possible for a user to maliciously alter the request for content to include commands, appearing to come from the web application, that will be harmful. This may include commands that will overload the origin server to cause a crash, commands that will delete content, or commands that will expose confidential content, for example.

By passing requests through the web application firewall 190 prior to passing it on to the origin server, this risk is mitigated. The web application firewall 190 can respond in a number of ways to requests for content that potentially contain malicious content. The request can be rejected, it can be modified, or it can be flagged, for example. According to an implementation, the web application firewall 190 will log each request for content that is identified.

The request for content is then passed on to the origin server 111 to retrieve the content. As above, the origin server provides the information back to content node 120, and the hash table 180 is updated. The content is then provided to the requester.

In FIG. 2C, the request for content is again provided to content node 120 and processed by filter 200. The filter flags requests from certain addresses and logs the action. The request then proceeds to the hash table 180, where the hash table 180 determines when the request needs to be forwarded to the origin server 111. If the hash table 180 determines that the request needs to be forwarded to the origin server 111, then the content node 120 moves the request to the web application firewall 190. Content node 120 may also create a new request for content to send to the origin server 111 to get the appropriate content. The web application firewall 190 reviews the request to ensure that there is nothing malicious in the request itself. The request is then forwarded to the origin server 111.

The origin server 111 returns the content to content node 120. There is a potential for a security breach in the content that is returned to content node 120. This could include a hijacking of the communication stream to insert malicious code, for example, or a malicious section of the request that is automatically returned by the origin server 111. In order to protect the client web application or end user form this threat, the content returned by the origin server 111 is run through the web application firewall 190 to scan for malicious content. Any malicious content can be acted on by the web application firewall 190 (i.e. flagged, deleted, rejected, etc.) and logged. The content is then passed to the hash table 180 which is updated, and the content is returned to the web application or user.

Figure 3:
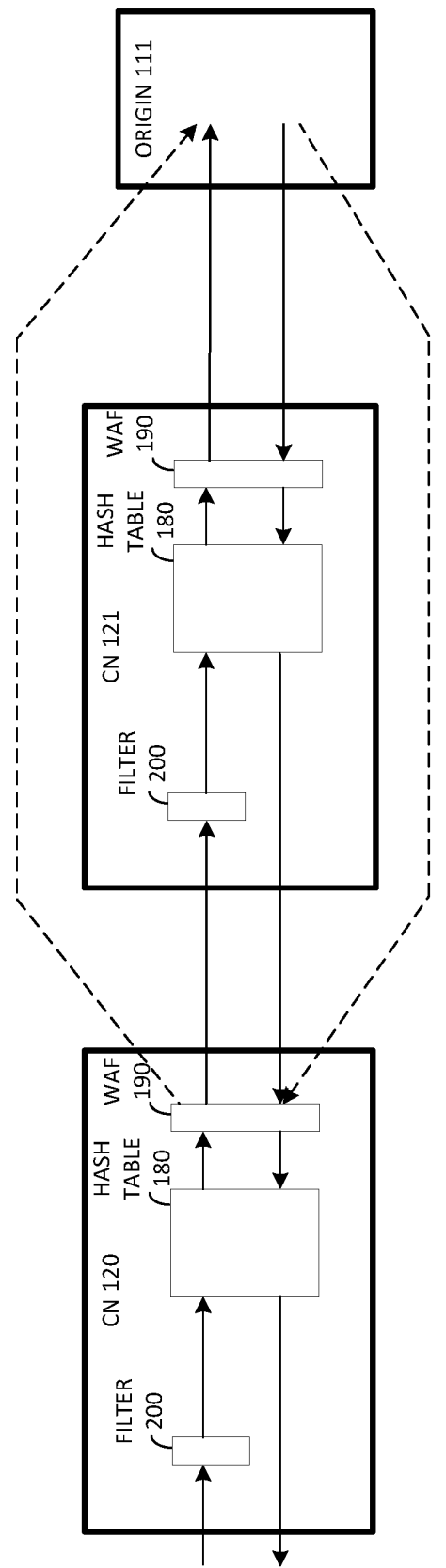
FIG. 3 illustrates a communication system with a firewall according to one implementation.

In FIG. 3 an implementation is shown in which multiple content nodes 120-121 operate together to respond to a request for content. Infrastructure services can have multiple content nodes 120-121 distributed around the world to provide faster access to content. Typically, content nodes 120-121 communicate periodically with each other to update cached content, operating rules, addressing changes, etc. At times between these periodic communications, some of the information can vary slightly between content node 120 and 121, for example.

Consequently, it can be advantageous for content nodes 120 and 121 to work together. As in FIG. 2C, a request is received by content node 120, passes through the filter 200 where requests from certain addresses are identified and logged. The request then proceeds to the hash table 180. The hash table 180 determines that content node 120 does not have the content requested and selects to send the request on to another content node 121 to request the content. The request for content is first passed through the web application firewall 190, where the request is scanned for malicious content.

The request is then transmitted to content node 121, where it is processed again. Because the content nodes 120 and 121 may vary slightly at the time of operation, the request for data passes through filter 201 to again verify that the address of the sender has not been flagged. If the sender has been flagged, then filter 201 will take action (i.e. reject the request, return the request, permit the request, etc.) and log the occurrence. The request will then pass to hash table 181, which may differ from hash table 180. The hash table 181 will determine that the request will be forwarded to the origin server 111. Prior to the request being sent to the origin server 111, it passes through the web application firewall 191 to be scanned for malicious content. The origin server 111 provides the requested content and returns it to content node 121. The content passes through the web application firewall 191 and proceeds to hash table 181, which is updated.

The content is then transferred to content node 120 and passes through the web application firewall 190. The hash table 180 is updated, and the content is returned to the user or web application.

An alternate path is shown in FIG. 3. When the request for content passes through the hash table 180, hash table 180 may determine that the request should be forwarded directly to the origin server. This could be due to the nature of the content (i.e. it is uncacheable data) or the nature of the request (i.e. a pass-through request). The request then proceeds through the web application firewall 190 to be scanned for malicious content, and directly to the origin server 111. Content node 120 may also create a new request for content to send to the origin server 111 to get the appropriate content. The origin server than provides the content back to content node 120 where it passes through the web application firewall 190 to be scanned for malicious content. Hash table 180 is updated and the content is returned to the user or web application. It should be understood that each of FIGS. 2A-2C can be used in collaboration with multiple content nodes 120-122 in any combination.

Figure 4:
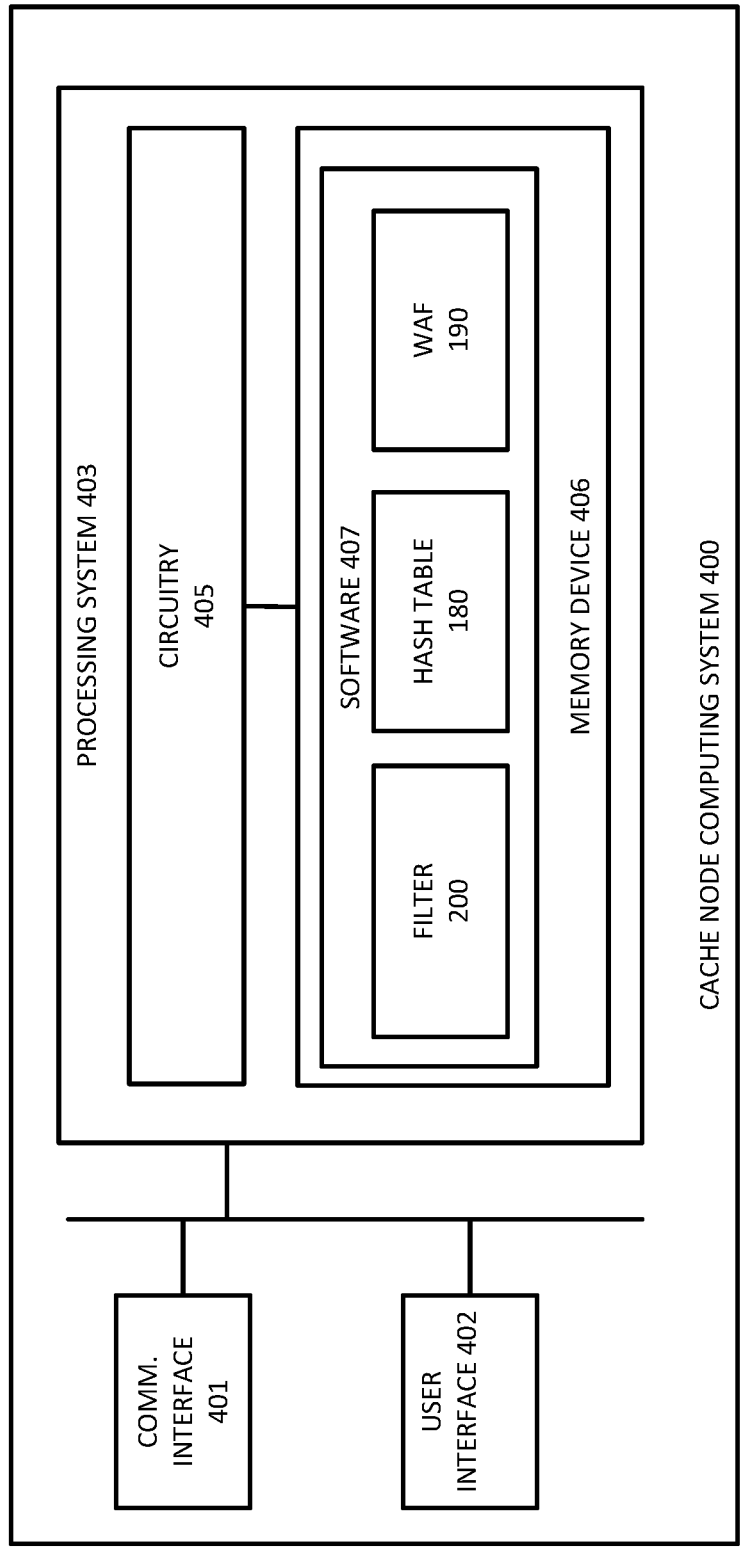
FIG. 4 illustrates a cache node computing system according to one implementation.

FIG. 4 illustrates a cache node computing system 400 according to one implementation. Cache node computing system 400 is representative of any computing system or systems with which the various operational architectures, processes, scenarios, and sequences disclosed herein for a cache node may be implemented. Cache node computing system 400 is an example of content nodes 120-122, although other examples may exist. Cache node computing system 400 comprises communication interface 401, user interface 402, and processing system 403. Processing system 403 is linked to communication interface 401 and user interface 402. Processing system 403 includes processing circuitry 405 and memory device 406 that stores operating software 407. Cache node computing system 400 may include other well-known components such as a battery and enclosure that are not shown for clarity. Cache node computing system 400 may comprise one or more server computing systems, desktop computing systems, laptop computing systems, or any other computing system, including combinations thereof.

Communication interface 401 comprises components that communicate over communication links, such as network cards, ports, radio frequency (RF), processing circuitry and software, or some other communication devices. Communication interface 401 may be configured to communicate over metallic, wireless, or optical links. Communication interface 401 may be configured to use Time Division Multiplex (TDM), Internet Protocol (IP), Ethernet, optical networking, wireless protocols, communication signaling, or some other communication format—including combinations thereof. In particular, communication interface 401 is configured to communicate with origin servers, other content nodes 120-122 and end users, to retrieve content to provide the content to end user devices and web applications.

User interface 402 comprises components that interact with a user to receive user inputs and to present media and/or information. User interface 402 may include a speaker, microphone, buttons, lights, display screen, touch screen, touch pad, scroll wheel, communication port, or some other user input/output apparatus—including combinations thereof. User interface 402 may be omitted in some examples. User interface 402 may also be remotely located, operating as a web application, for example.

Processing circuitry 405 comprises microprocessor and other circuitry that retrieves and executes operating software 407 from memory device 406. Memory device 406 comprises a non-transitory storage medium, such as a disk drive, flash drive, data storage circuitry, or some other memory apparatus. Processing circuitry 405 is typically mounted on a circuit board that may also hold memory device 406 and portions of communication interface 401 and user interface 402. Operating software 407 comprises computer programs, firmware, or some other form of machine-readable processing instructions. Operating software 407 includes filter 200, hash table 180, and web application firewall 190, although any number of software modules may provide the same operation. Operating software 407 may further include an operating system, utilities, drivers, network interfaces, applications, or some other type of software. When executed by processing circuitry 405, operating software 407 directs processing system 403 to operate cache node computing system 400 as described herein.

As discussed above, filter 200 operates at a network layer 3 (network layer) or layer 4 (transport layer) according to the OSI reference model. The filter 200 serves the purpose of identifying requests that come from dangerous sources. This may be implemented with a simple blacklist, in which dangerous addresses (i.e. IP addresses, HTTP addresses, etc.) are added to a list. When the filter identifies a request from one of the addresses on the list, it may reject or flag the request, and log the action.

Hash table 180 identifies where a request for content should be directed. Hash table includes a listing of the contents in cache in cache node computing system 400, for example, along with an indication of whether the content is current. Hash table 180 also may include information on what to do with particular request headers or instructions.

Web application firewall 190 operates at a network level 7 or equivalent according to the OSI reference model. Web application firewall 190 operates to identify dangerous content that may be hidden within a request for content, such as in the request header or instructions.

In at least one implementation, operating software 407 comprises a web accelerator, such as Pilopo, Squid, Varnish, Ziproxy, aiScaler, Apache Traffic Server, CACHEbox, Ishlangu, LotServer, or nginx, among others. The web accelerator can operate utilizing a script language or a compiled language, among others. The operating software 407 can operate in a single-threaded or multithreaded environment. For example, in an implementation, the operating software 407 comprises the Varnish web accelerator, which utilizes Varnish Configuration language (VCL), in a multithreaded environment. The Varnish web accelerator comprises a plurality of runtime parameters or rules that control how the web accelerator will function, including what modules will operate. These rules can be updated while Varnish is still running, without recompiling the web accelerator. This also allows the web application firewall 190 to identify and mitigate threats across a variety of supported platforms, such as HTTP, HTTPS, and TLS, utilizing both IPv4 and IPv6, for example.

As discussed above, content delivery network 115 provides services to multiple sources of content, such as content 145 and 146. As requests for content are received, multiple threads within the web accelerator allows the requests to be handled simultaneously, or near simultaneously. Each of these requests are handled according to the operating rules or procedures that have been identified for the relevant source of content. Thus, the web accelerator can handle multiple requests for content simultaneously or near simultaneously according to varying operating rules or procedures.

In an implementation, a user can update the Varnish operating rules through the user interface 402 while the cache node computing system 400 is still operating. The rules may provide operating parameters for the filter 200, hash table 180 or web application firewall 190, among others.

The rules for filter 200 may include a current list of addresses to be rejected or flagged, for example. The rules may also include instructions on what to do with requests from these addresses. One of ordinary skill in the art would understand that other rules for filter 200 may be included.

The rules for hash table 180 may include information on what content is cacheable, and what information is uncacheable. It may include instructions on which content nodes 120-122 should be contacted prior to contacting origin server 111 for content. It may include instructions for the hash table 180 to determine whether content is current or stale. It may include parameters for when requests should be passed straight through to the origin server 111. One of ordinary skill in the art would understand that other rules for hash table 180 may be included.

The rules for web application firewall 190 may include information on what content is considered dangerous or malicious. Particular items might be identified in the rules, or general guidelines might be identified. The rules may also contain parameters on what action the web application firewall 190 is to take when dangerous content is discovered, and how this should be logged. One of ordinary skill in the art would understand that other rules for web application firewall 190 may be included.

Figure 5:
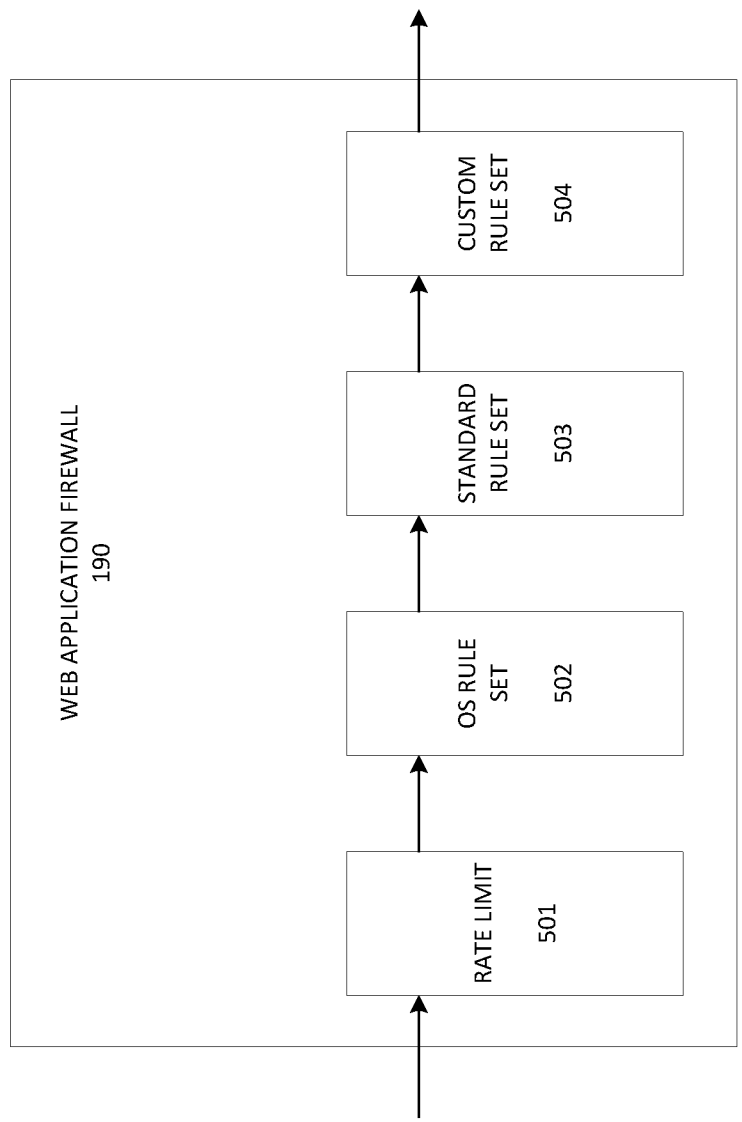
FIG. 5 illustrates a web application firewall rule set according to one implementation.

FIG. 5 presents an implementation of web application firewall 190. As discussed above, web application firewall 190 operates at least on network layer 7 according to the OSI reference model or at a level that allows web application firewall to scan requests that are to be passed in or out of content node 120 for dangerous or malicious content. In an implementation Web application firewall 190 is operated in accordance with at least rate limit 501, operating system ruleset 502, standard rule set 503, and custom rule set 504.

Rate limit 501 serves to protect content node 120 and web application firewall 190 in case of an attack. Content node 120 and web application firewall 190 can be overloaded by a user sending a large number of requests to content node 120. This may be combined with the user sending malicious content to content node 120 at the same time. A common attack, for instance is SQL injection, in which malicious SQL statements are inserted in an entry field for execution. This could be flagged by web application firewall 190, but if used in combination with a large number of requests, the web application firewall 190 may be overloaded and overlook the SQL injection. Rate limit 501 provides an option to limit the rate at which requests from a certain address or group of addresses will be handled by content node 120 or web application firewall 190. Rate limit 501 may include operating parameters or rules identifying when the limit is to be utilized, what addresses or groups of addresses should be limited, and what the limit should be.

It should be understood that rate limit 501 could be included with filter 200 instead of in the web application firewall 190. This could provide the same protection for content node 120, though the protection to web application firewall 190 may be lessened. Rate limit 501 can be updated by a user through user interface. In an implementation, this update could happen while the web accelerator is operating, without the need to restart the web accelerator.

In an implementation, infrastructure service 115 is operated by an individual or company that provides services to a client, such as the owners or managers of origin server 111. The operator of infrastructure service 115 utilizes a web application firewall 190 that is available off-the-shelf and comes with a pre-programmed set of parameters. This set of parameters is called the operating system rule set 502. The operator of the infrastructure service 115 customizes the off-the-shelf web application firewall 190 and created its own set of parameters. This is called the standard rule set 503. The client then also has the opportunity to customize the web application firewall further. The additional rules from the client are called the custom rule set 504.

In an implementation, the rules may be written in a specific language or format. For example, many firewall rules are written in a Modsecurity rule format. In order to utilize rules for the operating system rule set 502, for example, web application firewall 190 may be designed to utilize rules in this format. Further, the rules in the standard rule set 503 and the custom rule set 504 may also be designed in the Modsecurity rule format. In an implementation, the rules may be translated from the Modsecurity rule format into a format that can function in the web application firewall 190, such as a Varnish web accelerator.

Each of operating system rule set 502, standard rule set 503 and custom rule set 504 can be modified by a user through the user interface 402. In an implementation, the user can select which rules to use from the operating system rule set 502 and the standard rule set 503. The user can also add change and delete rules as well as select which rules to use from the custom rule set 504. The user can additionally activate and deactivate any rule. Additionally, the user could select threshold levels for the rules, such as anomaly thresholds, or error thresholds. The rules are selected and set specifically for the relevant content. Therefore, since content node 120 can handle requests for multiple sources of content, there may be multiple sets of selected rules for web application firewall, one set for each source of content. The rule sets are invoked according to a priority level. The default priority level could be operating system rule set 502, followed by standard rule set 503, and finally custom rule set 504. Thus, if a rule from the custom rule set 504 conflicts with a rule from the standard rule set 503, the rule from the standard rule set 503 will be used. One of ordinary skill in the art would understand that this priority could be changed as desired.

It should be noted that the different rule sets, i.e. operating system rule set 502, standard rule set 503, and custom rule set 504 may each have different levels of customization available. For example, operating system rule set 502 may have a high level of customization available, as it was designed for a broad usage audience. Therefore, the rules may have a high level of threshold level adjustment available. Custom Rule set 504 may be less customizable, as it was designed for a specific situation. The user may only be able to select or deselect rules within the custom rule set 504, while the user may be able to fully customize the rules within operating rule set 503, for example.

In an implementation, web application firewall 190 also creates a log record any time any of the rules are invoked.

This log can be available to the user over the user interface 402 in real-time, or as historical information for analysis.

Figure 6:
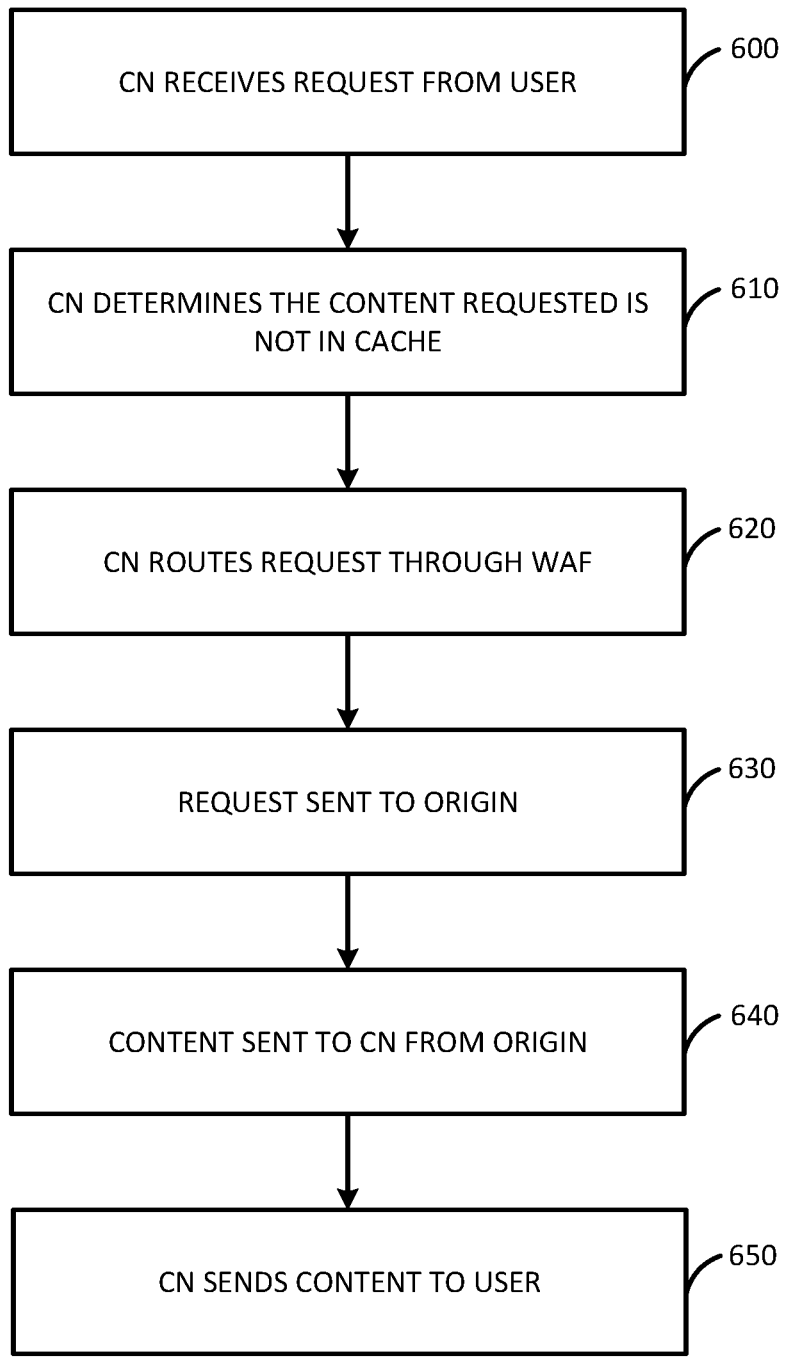
FIG. 6 illustrates a method of operating a web application firewall in an infrastructure service according to one implementation.

A method of implementation is shown in FIG. 6. In 600, a content node, such as content node 120, receives a request for content from a user. The request may be a request for content typed into a web browser by an end user, or it may be a computer-generated request. The computer-generated request, for example may come from a web application running on an end user device. Alternatively, the request may be a request that has been previously processed by another content node (i.e. content node 121) and has been forwarded to content node 120 for further processing.

In step 610, content node 120 determines that the requested content is not in cache within content node 120. As part of this determination, the request must first pass through filter 200 to determine whether the request will be processed. Filter 200 comprises a list of addresses that will be flagged and rejected. Filter 200 operates at network layers 3 or 4 according to the OSI reference model. Each time filter 200 is invoked to flag or reject a request, the instance will be logged.

The request for content is then analyzed by content node 120. The request proceeds to a hash table 180 that will determine, among other things, whether the cache holds the content that has been requested. This analysis is sometimes called a "hit/miss" analysis. A "hit" occurs when the content is located in cache on content node 120, and the content is recent enough that it is considered current according to the operating parameters. These operating parameters may vary according to the content requested. A "miss" occurs when the content is not available at content node 120, either because it has never been cached, or the cached version is too old to be considered current according to the operating parameters. The hash table 180 can also identify when requested content is uncacheable, or when a request is a pass-through request. Uncacheable content is content that is dynamic, i.e. it is never the same twice. This can be the case for content requested by web applications, for example. A pass-through request is a request that has been tagged to pass directly through to the origin server 111. In an implementation, in any situation other than a "hit," content node 120 will need to forward a request to another content node (i.e. content node 121) or to an origin server 111.

In step 620, after identifying that the content is not available within content node 120 and the request will be forwarded to an origin server 111, the request is first forwarded through web application firewall 190. Web application firewall 190 screens the request according the operating parameters in order to detect dangerous or malicious content within the request. Optionally, requests for content that are forwarded to another content node could also be routed through web application firewall 190. The load on web application firewall 190 is dramatically reduced by identifying which requests can be served directly by content node 120 before routing through web application firewall 190.

After routing the request through web application firewall 190, in step 630, the request is forwarded to origin server 111. The actual form of the request can be the request as originally submitted to content node 120, the original request with modifications, or a new request created by content node 120.

In step 640, the content is sent to content node 120 from origin server 111. Optionally the content can again be routed through web application firewall 190. Web application firewall 190 could utilize a second set of operating rules for content returning from origin server 111. This second set of operating rules could be directed to different risks presented in the content returning from the origin server 111. The content will again pass through hash table 180 to be cached or logged, and in step 650, the content is returned to the user.

Figure 7:
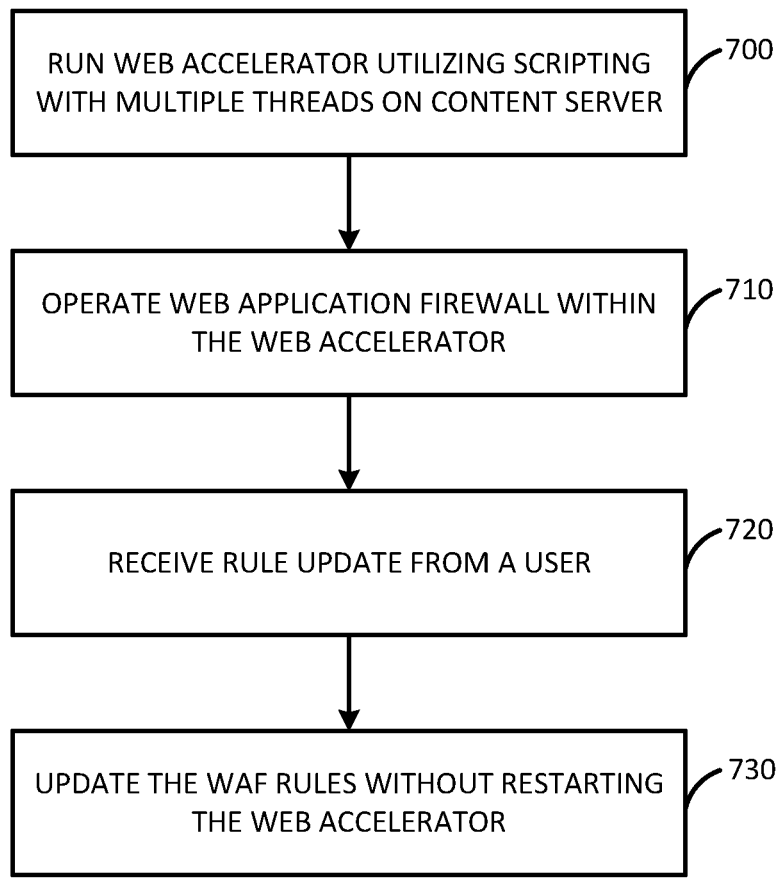
FIG. 7 illustrates a method of updating a rule set for a web application firewall according to one implementation.

FIG. 7 shows an implementation of updating the operating rules for web application firewall 190. In step 700, content node 120 runs a web accelerator utilizing scripting with multiple threads. For example, content node 120 can run Varnish with multiple threads. As discussed above, content node 120 can service many different sources of content. Consequently, content node 120 can receive many requests for content simultaneously or near simultaneously. Multiple threads allow Varnish running on content node 120 to handle each of the request independently, and according to the operating rules that have been set up for each source of content.

In step 710, web application firewall 190 is operated within the web accelerator. In an implementation, web application firewall is not applied to every request for content, but only to those requests that will be forwarded to origin server 111. The web application firewall 190 could be the last module for the request prior to it being forwarded to the origin server 111. Alternatively, the web application firewall 190 could be utilized for all requests for information that are passed out of content node 120, either to another content node (i.e. content node 121) or an origin server 111.

Each time web application firewall is run, it utilizes a set of operating rules. These rules can be separated into three groups, such as operating system rules, standard rules and custom rules. The set of rules applied to web application firewall 190 depends on the content requested. When content node 120 handles requests for many different sources of content, there can be many different sets of operating rules for web application firewall 190. For instance, when content node 120 receives a request for content from www.alpha.com (i.e. content 145), and content node 120 determines by hash table 180 that the request will be forwarded to origin server 111, the set of rules for content 145 will be utilized for web application firewall 190. A request for content from www.beta.com may arrive to content node 120 at nearly the same time, and content node 120 may determine that the request also needs to be forwarded to the origin server, in this case origin server 112. The request for content will be screened by web application firewall 190 utilizing the set of rules for content 146.

In step 720, content node 120 receives a rule update for web application firewall 190. This can take place through user interface 402, and may occur through direct data entry, through a web application, etc. The rule update will come from a user that corresponds to one of the sources of content. For example, Alpha may be the operator for www.alpha.com, i.e. content 145. Alpha may submit a rule update to the set of rules identified for web application firewall to utilize for content requests relating to www.alpha.com. In an embodiment, Alpha may be able to select from a set of rules provided by the web application firewall, and another set of rules provided by the operator of content node 120. Alpha may also be able to create or select additional custom rules. The rule update may de-select any of the above rules that were already active in the operating rules for the web application firewall with respect to www.alpha.com.

In step 730, the rule update provided by Alpha is applied to web application firewall 190. In the web accelerator, this update takes place without restarting the web accelerator. Thus, while the update is being received on one thread, a request for content from www.beta.com may be handled on another thread. When content node 120 determines that the request for content needs to be forwarded to origin server 112, web application firewall 190 will screen the request for content according to the rules in place for www.beta.com. After the update has taken place, a new request for content from www.alpha.com may be received by content node 120. When content node 120 determines that request needs to be forwarded to origin server 111, the request will first pass through web application firewall 190 utilizing the updated set of rules submitted by Alpha. The system does not need to shut down in order to incorporate the changes.

As discussed above, in an embodiment, the rules for web application firewall 190 may be written in a common language or format, such as the Modsecurity format. In order to function within a web accelerator, such as the Varnish web accelerator, for example, the rules may need to be translated or reformatted into Varnish Configuration Language, or some other similar language or format. This translation can be done manually or can be partially or fully automated.

Consider the following rule from an operating system rule set 502 which identifies UTF-8 abuse attacks:

```
# Check UTF encoding
# We only to apply this check if UTF-8 encoding is actually used by the site,
# otherwise it will result in false positives.

# -=[ Rule Logic ]=-
# This chained rule first checks to see if the admin has set the
# TX:CRS_VALIDATE_UTF8_ENCODING variable in the crs-setup.conf
file.

SecRule TX:CRS_VALIDATE_UTF8_ENCODING "eq 1" \
"phase:request, \
rev: '2', \
ver: 'OWASP_CRS/3.0.0', \
maturity: '6', \
accuracy: '8', \
t:none, \
msg: 'UTF8 Encoding Abuse Attack Attempt', \
id:920250, \
tag: 'application-multi', \
tag: 'language-multi', \
tag: 'platform-multi', \
tag:'OWASP_CRS/PROTOCOL_VIOLATION/EVASION', \
severity: 'WARNING', \
chain"
    SecRule REQUEST_FILENAME|ARG|ARGS_NAMES
"validateUTF8Encoding" \
        "setvar: 'tx.msg = %(rule.msg)', \
        setvar: tx.anomaly_Score=+%(tx.warning_anomaly_score), \
setvar:tx.%(rule.edi)-OWASP_CRS/PROTOCAL_VIOLATION/
EVASION-%(matched_var)
```

This rule in the Modsecurity format was passed through a Modsecurity rule parser and a VCL generation tool chain. This toolchain translates the Modsecurity rule in to Varnish Configuration Language code block, mapping the Modsecurity transform function into a Varnish runtime equivalent. The equivalent rule in Varnish Configuration Language is shown below in a simplified form.

```
        [..]
        If    (!waf.validateUtf8Encoding(arg_key) ||
                !waf.validateUTF8Encoding(arg_val)) (
            set waf.anomaly_score +=...;
            set waf.rule_id = 920250;
            [..]
            set waf.severity = 4
        )
        Return (...);
        )
        [..]
```

Several considerations must be made when translating to ensure proper functionality of the translated rules. By way of example, Modsecurity has a number of transforms that allow rule writers to normalize request data. This helps to reduce the number of rule variants. URL decoding, for example, can be handled with t:urlDecodeUni so that separate rules are not needed for encoded and unencoded forms of a URL. Additionally, Modsecurity represents certain variables as collections, which are basically lists. For example, a request can include a number of headers. A collection can be defined for header data, which would contain a key/value pair for each header in the collection. Modsecurity could then iterate over each item in the collection and perform comparisons. Further, Modsecurity allows chaining rules together to effectively allow rule writers to implement logical "AND: operations within the rule. Each of these considerations must be allowed for in the translation of the rule so that the translated rule will function as expected.

Following translation of the rules, the rules can be tested according to an implementation. For example, a testing framework could be created. This framework could be written in Python and can be used as a python module available to be embedded in a variety of code instances. Additionally, it could be used in a stand-alone manner using the py.test python testing framework.

The testing framework loads a YAML specification of an HTTP request (containing attack payloads or other elements of web application attacks) and translates it into an HTTP request. Entire test corpuses can be created to ensure that the rules are detecting the attacks. This framework can allow a tester to be very detailed and explicit about the requests and allows for flexibility on interpretation of success or failure of the tests. In some implementations, the operating system rule set 502 may contain rules that have already been tested in Modsecurity format. These tests can create a baseline for the testing of the translated rules. In some cases, the rules are still being developed, and aren't working yet. It can be advantageous, therefore, to create a baseline that identifies the rules that are not working yet, or those rules that are expected to fail.

An example of a test is shown below:

```
---
    meta;
        author: Christian S.J. Peron"
        description: None
        enabled: true
        name: 94120.yaml
    tests:
    -
        test_tile: 94120-1
        desc: "Injection of a SQL operator"
        stages:
        -
            stage:
                input:
                    dest_addr: 127.0.0.1
                    headers:
                        Host: localhost
                    method: GET
                    port: 80
                    uri: "/var=blahblah&var2=LIKE%2)NULL"
                    version: HTTP/1/0
                output:
                    log_contains: id "94120"
```

This test example contains various YAML fields. Meta includes the meta-data associated with the test, such as author, test description, and indicator on whether the rule is enabled, etc. Test includes a title and optional descriptions followed by one or more stages. The rule shown above includes only one stage, but additional stages may be defined, for example, if an application needs to be moved into a certain state before delivering a payload. Input defines most of the attack payloads, either in the form of URIs, headers or POST body content. Output is used to check whether the identification of a specific attach payload was detected. In the above example, this is done by checking a log file for the presence of the pattern: id "942120". Other possible output specifications could include checking for a 400 error code returned by the HTTP server, for example.

In some cases, the web application firewall 190 could find multiple faults in a request. When testing rules, it can be important to ensure that the correct rule is causing the fault. Simply checking HTTP error codes can be insufficient. For example, a PHP object injection test will fail multiple rules in the operating system rule set 502, the standard rule set 503 and/or the custom rule set 504. For testing, it can be important to know which rules caused the failure. In an implementation, [X-Request-ID] can be used, which is a timestamp along with the rule and test ID that the payload is designed to trigger is tracked. Additionally, information items such as whether the test was successful, and an HTTP response code could be tracked.

The testing harness in an implementation first defines a function which loads the YAML configurations. The first argument in the example below is the directory/path containing the YAML files, and the second is a flag indicating whether to recurse. Then the list of rules is returned.

```
Def get_rulesets (ruledir, recurse):
    """""
    List of ruleset objects extracted from the yaml directory
    """""
    yaml_files =[ ]
    if os.path.isdir(ruledir) and recurse != 0:
        for root, dirs, files in os.walk(ruledir):
            for name in files:
                filename, file extension = os.path.splitext(name)
                if file extension == '.yaml':
                    yaml_files.append(os.path.join(root, name))
    if os.path.isdr(ruledir):
        yaml_files = util.get_files(ruledir, 'yaml')
    elif os.path.isdir(ruledir):
        yaml_files = (ruledir)
    extracted_files = util.extract_yaml(yaml_files)
    rulesets = [ ]
    for extracted_yaml in extracted_files:
        rulesets.append(ruleset.Ruleset(extracted_yaml))
    return rulesets
```

Additionally, the testing harness could include additional operations, such as a way to control the scope of the test in a very granular way, potentially represented as a configuration file, or a mechanism which identifies the tests that are expected to fail. This could prevent failed tests from triggering fatal CI failures.

Following loading the testing harness, the actual tests can be executed:

```
testfiles = get_rulesets(co.rule_path, co.recurse)
for tf in testfiles:
    for test in tf.tests:
        ruleid = test.test_title.spit("-")[0]
        now = time.time( )
        # Get some unique tag to associated with the test
        # We use seconds since UNIX epoch, rule ID and test ID
        # For example: 1503088616.96_942120-1
        logtag = get_some_tag(now, test.test_title)
```

```
        runner = testrunner.TestRunner ( )
        for stage in test.stages:
            odict = stage.output.output_Dict
            headers = stage.input.headers
            if not "X-Rquest_Id" in headers.key( ):
                stage.input.headers ["X-Request-Id] = logtag
            try:
                hua = http.HttpUA( )
            except:
                pring "failed to initialize UA object"
                sys.exit(1)
            try:
                runner.run_stage(stage, None, hua)
            except Exception as e:
            # handle exception(s)
```

This testing process can be a continuous process. This process could not only serve as a continuous integration, but also as a tool to identify any regressions in the tool chain, or in the rule sets for the web application firewall 190. In an implementation, the process could be: 1) a branch of the rule repository is created; 2) a change is made (fixing evasion vulnerability, performance optimization, etc.); 3) Create a PULL request; 4) CI jobs trigger; 5) Container launched; 6) Caching engine provisioned into the container; 7) Varnish Configuration Language tool chain is checked out (this could include any or all of the rule sets 502-504); 8) Regular expressions are extracted from the rulesets and checked for regular expressions denial of service conditions (reDOS); 9) An "origin" server is provisioned, and local logging integration is configured. This origin server can be a dumb HTTP responder which responds unconditionally with 200 and a cache control configuration for Varnish, so that Varnish won't cache anything; 10) Rulesets are translated into Varnish configuration language, augmented with some logging and origin configurations. Additionally, Varnish is configured to log the X-Request-Id header along with web application firewall data; 11) Compile and load into Varnish; 12) Web application firewall CI code is launched and run through the test corpus; 13) Varnish logs are reviewed to identify which rules successfully identified the payload.

Returning to the elements of FIG. 1, content nodes 120-122 and origin servers 111-112 can each include communication interfaces, network interfaces, processing systems, computer systems, microprocessors, storage systems, storage media, or some other processing devices or software systems, and can be distributed among multiple devices. Examples of content nodes 120-122 and origin servers 111-112 can include software such as an operating system, logs, databases, utilities, drivers, caching software, networking software, and other software stored on a computer-readable medium. Content nodes 120-122 and origin servers 111-112 may each comprise, in some examples, one or more server computing systems, desktop computing systems, laptop computing systems, or any other computing system, including combinations thereof.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof. End user devices 130-132 can each include communication interfaces, network interfaces, processing systems, computer systems, microprocessors, storage systems, storage media, or some other processing devices or software systems.

Communication links 170-176 each use metal, glass, optical, air, space, or some other material as the transport media. Communication links 170-176 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-176 can each be a direct link or can include intermediate networks, systems, or devices, and can include a logical network link transported over multiple physical links. Although one main link for each of links 170-176 is shown in FIG. 1, it should be understood that links 170-176 are merely illustrative to show communication modes or access pathways. In other examples, further links can be shown, with portions of the further links shared and used for different communication sessions or different content types, among other configurations. Communication links 170-176 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a content server within an online service, the method comprising:
   receiving, at the content server, a request for content wherein the content comprises data to be provide to a web application;
   filtering the request for the content;
   identifying a source of the content;
   determining that the content will be requested from a second server;
   after determining that the content will be requested from the second server, identifying a first set of rules for a Web Application Firewall (WAF) from among a selection of sets of rules and reviewing the request for the content with the WAF according to the first set of rules, wherein the first set of rules corresponds to the source of the content;
   forwarding the request for the content to the second server;
   receiving the content from the second server; and
   providing the content.

2. The method of claim 1, wherein:
   the second server is configured to provide data from a selection of sources; and
   the selection of sources comprises the source of the content.

3. The method of claim 1, wherein the second server comprises an origin server.

4. The method of claim 1, wherein the data to be provided to the web application comprises dynamic data.

5. The method of claim 1, wherein the data to be provided to the web application comprises uncacheable data.

6. The method of claim 1, wherein filtering the request for the content comprises comparing an address of a sender of the request for the content to a list of addresses.

7. The method of claim 1, wherein determining that the content will be requested from the second server comprises determining that the content is not available within the content server.

8. The method of claim 1, wherein the first set of rules comprises:
   a set of operating system rules;
   a set of standard rules; and
   a set of custom rules.

9. A content server within an online service, the content server comprising:
   a processor; and
   memory with instructions stored thereon, which, when executed by the processor, cause the content server to:
      receive, at the content server, a request for content wherein the content comprises data to be provided to a web application;
      filter the request for the content;
      identify a source of the content;
      determine that the content will be requested from a second server;
      after determining that the content will be requested from the second server, identify a first set of rules for a Web Application Firewall (WAF) from among a selection of sets of rules and review the request for the content with the WAF according to the first set of rules, wherein the first set of rules corresponds to the source of the content;
      forward the request for the content to the second server;
      receive the content from the second server; and
      provide the content.

10. The content server of claim 9, wherein:
    the second server is configured to provide data from a selection of sources; and
    the selection of sources comprises the source of the content.

11. The content server of claim 9, wherein the second server comprises an origin server.

12. The content server of claim 9, wherein the data to be provided to the web application comprises dynamic data.

13. The content server of claim 9, wherein the data to be provided to the web application comprises uncacheable data.

14. The content server of claim 9, wherein the instructions, when executed by the processor, cause the content server to compare an address of a sender of the request for the content to a list of addresses to filter the content.

15. The content server of claim 9, wherein the instructions, when executed by the processor, cause the content server to determine that the content is not available within the content server to determine that the content will be request from the second server.

16. The content server of claim 9, wherein the first set of rules comprises:
    a set of operating system rules;
    a set of standard rules; and
    a set of custom rules.

17. A method of operating a server within an online service, the method comprising:

receiving, at the content server, a request for content wherein the content comprises data to be provided to a web application;

filtering the request for the content;

identifying a source of the content;

determining that the content will be requested from a second server;

after determining that the content will be requested from the second server, identifying a first rule for a Web Application Firewall (WAF) from among a set of rules and reviewing the request for the content with the WAF according to the first rule, wherein the first rule corresponds to the source of the content;

creating a new request for the content to send to the second server;

receiving the content from the second server; and providing the content.

18. The method of claim 17, wherein filtering the request for the content comprises comparing an address of a sender of the request for the content to a list of addresses.

19. The method of claim 17, wherein determining that the content will be requested from the second server comprises determining that the content is not available within the content server.

20. The method of claim 17, wherein the data to be provided to the web application comprises dynamic data.

* * * * *